United States Patent [19]

Kingston et al.

[11] Patent Number: 5,101,370

[45] Date of Patent: Mar. 31, 1992

[54] PROGRAMMABLE DIGITAL ACCUMULATE AND SCALE CIRCUIT

[75] Inventors: Samuel C. Kingston; Steven T. Barham, both of Salt Lake City; Harold L. Simonsen, West Valley City, all of Utah

[73] Assignee: Unisys Corporation, Blue Bell, Pa.

[21] Appl. No.: 559,017

[22] Filed: Jul. 26, 1990

[51] Int. Cl.[5] .............................................. G06F 7/38
[52] U.S. Cl. ...................................... 364/733; 364/736
[58] Field of Search ........... 364/733, 715.01, 784–788, 364/736

[56] References Cited

U.S. PATENT DOCUMENTS

| | | |
|---|---|---|
| 3,999,052 | 12/1976 | Gooding et al. ................. 364/786 X |
| 4,110,832 | 8/1978 | Leininger et al. ................. 364/786 |
| 4,203,157 | 5/1980 | Daniels et al. ..................... 364/788 |
| 4,677,582 | 6/1987 | Nagafuji ........................ 364/784 X |
| 4,808,939 | 2/1989 | Kingston ......................... 375/96 X |

*Primary Examiner*—Tan Y. Mai
*Attorney, Agent, or Firm*—John B. Sowell; Mark T. Starr

[57] ABSTRACT

A novel accumulate and scale circuit is provided with an input accumulator which is only as wide as the input data stream. Additional most significant bits are generated to extend the output of the accumulate and scale circuit by providing and an up and down counter having a number of most significant bit stages. The adder stages of the input accumulator have their carry and borrow outputs coupled to the up and down counter for generating additional most significant bits.

7 Claims, 3 Drawing Sheets

PROGRAMMABLE DIGITAL ACCUMULATE AND SCALE CIRCUIT

BACKGROUND OF THE INVENTION

1. Field of the Invention

The present invention relates to a novel digital accumulate and scale circuit. More particularly, the present invention relates to a novel input accumulator in the novel accumulate and scale circuit which is only as wide as the input data stream and the additional most significant bits for the novel accumulator are generated at the output of the accumulator by an up/down counter coupled to the output carry of the input accumulator.

2. Description of the Prior Art

Heretofore, analog accumulate and scale circuits were known. An analog example of such circuit is an integrate and dump circuit which is not easily programmed. Further, digital equivalents of the analog continuous integrate and dump circuits are known. The digital accumulators of such digital accumulate and dump circuits require as many adder stages as are desired to accommodate the maximum range of binary numbers in the output of the accumulator. When a large output stage is to be provided in a digital accumulator, it requires a large amount of adder time to propagate the carries to the highest order stages. One method of reducing this propagation time is to employ a pipeline adder or adders. The penalty for decreasing propagation time using such pipeline adders is that more complex circuitry is required which is more difficult to implement in hardware and also requires more chip real estate when implemented in very large scale integrated circuit form.

It would be highly desirable to provide a programmable digital integrate and scale circuit which embodies all of the advantages of pipeline adders without the penalties of the complex and more expensive circuitry.

SUMMARY OF THE INVENTION

It is a primary object of the present invention to provide a novel programmable digital accumulate and scale circuit which achieves the digital version of a rectangular matched filter.

It is a primary object of the present invention to provide an accumulator for an accumulate and scale circuit that contains only as many significant bits as the input data stream.

It is a primary object of the present invention to provide a novel up/down counter coupled to the carry or borrow output of an input accumulator to provide as many additional significant bits as desired for the output of the accumulator.

It is another object of the present invention to provide a novel bias removal circuit as an input to the accumulator of the accumulate and scale circuit.

It is a general object of the present invention to provide a simplified programmable circuit for scaling the output values of an accumulator by a power of 2 to provide scaled most significant bits as an output value.

According to these and other objects of the present invention, there is provided a novel programmable digital accumulate and scale circuit having an input accumulator only as wide as the input data stream. The input accumulator comprises an input buffer stage and a plurality of adder stages and an output register for storing the accumulated values. The adder stages provide both carry and borrow outputs which are coupled to a novel up and down counter which serves as a register or extension of the accumulator providing additional most significant bits in excess of the input data stream.

DESCRIPTION OF THE PREFERRED EMBODIMENT

Figure 1:
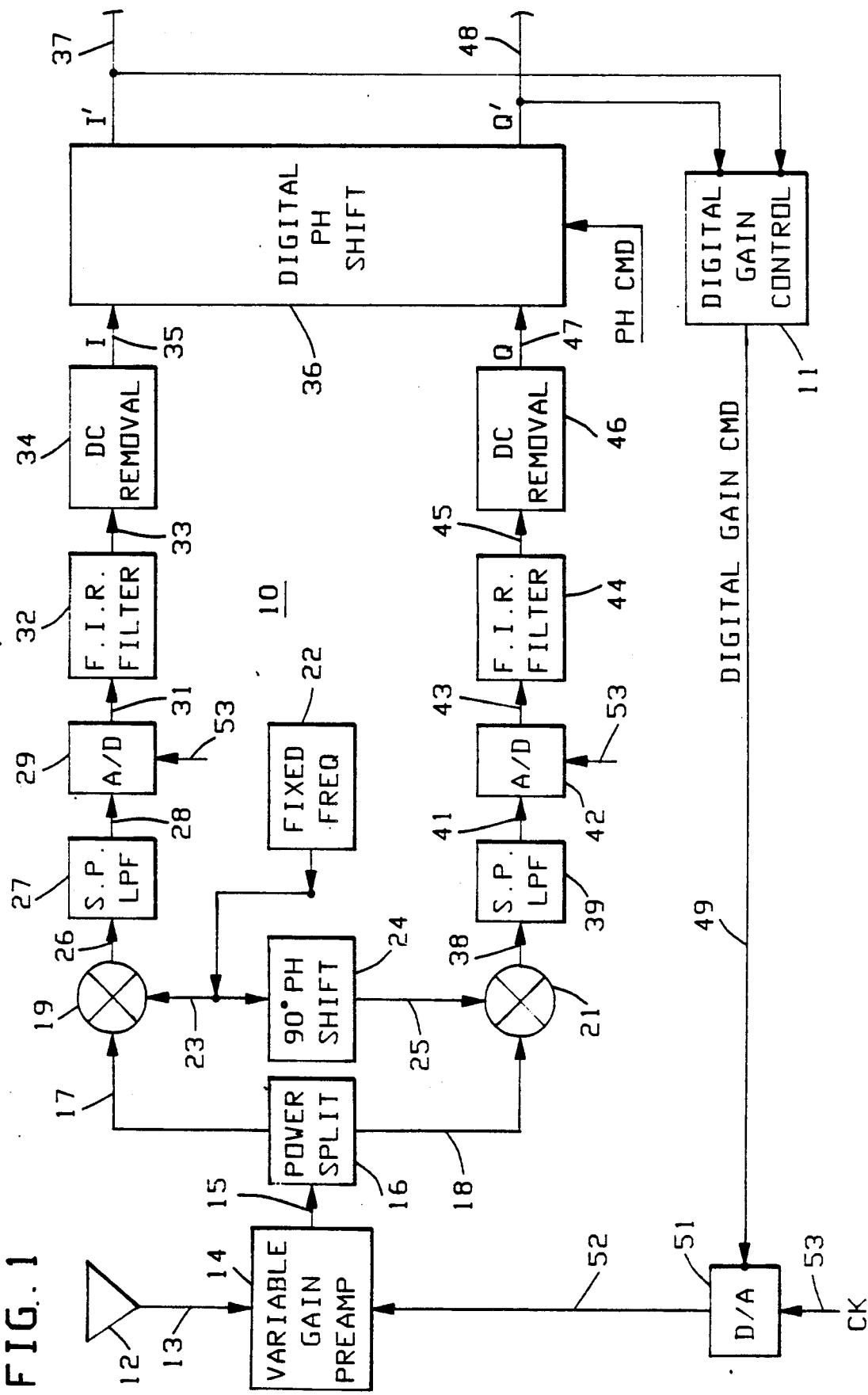
FIG. 1 is a schematic block diagram of a communications receiver pre-processing circuit illustrating a preferred embodiment use of the present invention digital code or symbol tracking loop.

Refer now to FIG. 1 showing the present invention programmable digital gain controller 11 connected to a data stream of a digital sample data communications receiver 10. The radio frequency signals received by the antenna 12 are coupled via line 13 as analog signals to a variable gain preamplifier 14 to provide a controlled level output signal on line 15 to power splitter 16. The RF analog signal on lines 17 and 18 are applied to a pair of mixers 19 and 21 connected to the real and imaginary channels I and Q respectively. A fixed frequency oscillator 22 has an output on line 23 which is connected to mixer 19 and to a 90° phase shifter 24 which provides a quadrature output on line 25 to mixer 21. The real analog RF signal on line 26 is applied to a single pole low pass filter 27 to provide a filtered analog output signal on line 28. The analog signal at the input of A to D converter 29 is converted to a digital output on line 31 which is applied to a finite impulse response (FIR) filter 32 to provide a filtered digital signal on line 33 which has some D.C. component that is removed by D.C. removal circuit 34 to provide the real digital signal on line 35. The real digital signal on line 35 is applied to a digital phase shifter 36 of the type set forth in my U.S. Pat. No. 4,841,552 to provide a phase shifted signal on line 37 shown as I'.

In a manner similar to that described above, the output signal on line 38 in the imaginary channel Q is applied to a low pass filter 39 whose output on line 41 is applied to an A to D converter 42. The digital output on line 43 is applied to a filter 44 and the filtered output on line 45 is applied to a D.C. removal circuit 46 to provide the imaginary digital signal Q on line 47. The imaginary signal Q on line 47 is applied to the digital phase shifter 36 of the type described in U.S. Pat. No. 4,841,552 to provide the phase shifted imaginary signal Q' on line 48. The real and imaginary signals on line 37 and 48 are connected to a preferred embodiment digital gain controller 11 to provide a digital gain command on line 49, which is shown connected to digital to analog converter 51. The analog output on line 52 is connected to the analog variable gain preamplifier 14 to control the output signal on line 15 at a predetermined controlled level. When the variable gain preamplifier is provided with a digital input, the digital gain command on line 49 may be coupled directly to the preamplifier 14 so as to eliminate the D to A converter 51. Clock strobe signals such as that shown on line 53 are applied to the digital blocks which occur after the A to D converters 29 and 42. The low pass filters 27 and 39 may be constructed as RC filter circuits and the FIR filters 32 and 44 may be constructed in the manner shown in my U.S. Pat. No. 4,808,939. It will be understood that all of the schematic blocks shown in the FIG. 1 embodiment need not be constructed according to my previously mentioned patents but may be constructed by other equivalent circuits known in the prior art.

Figure 2:
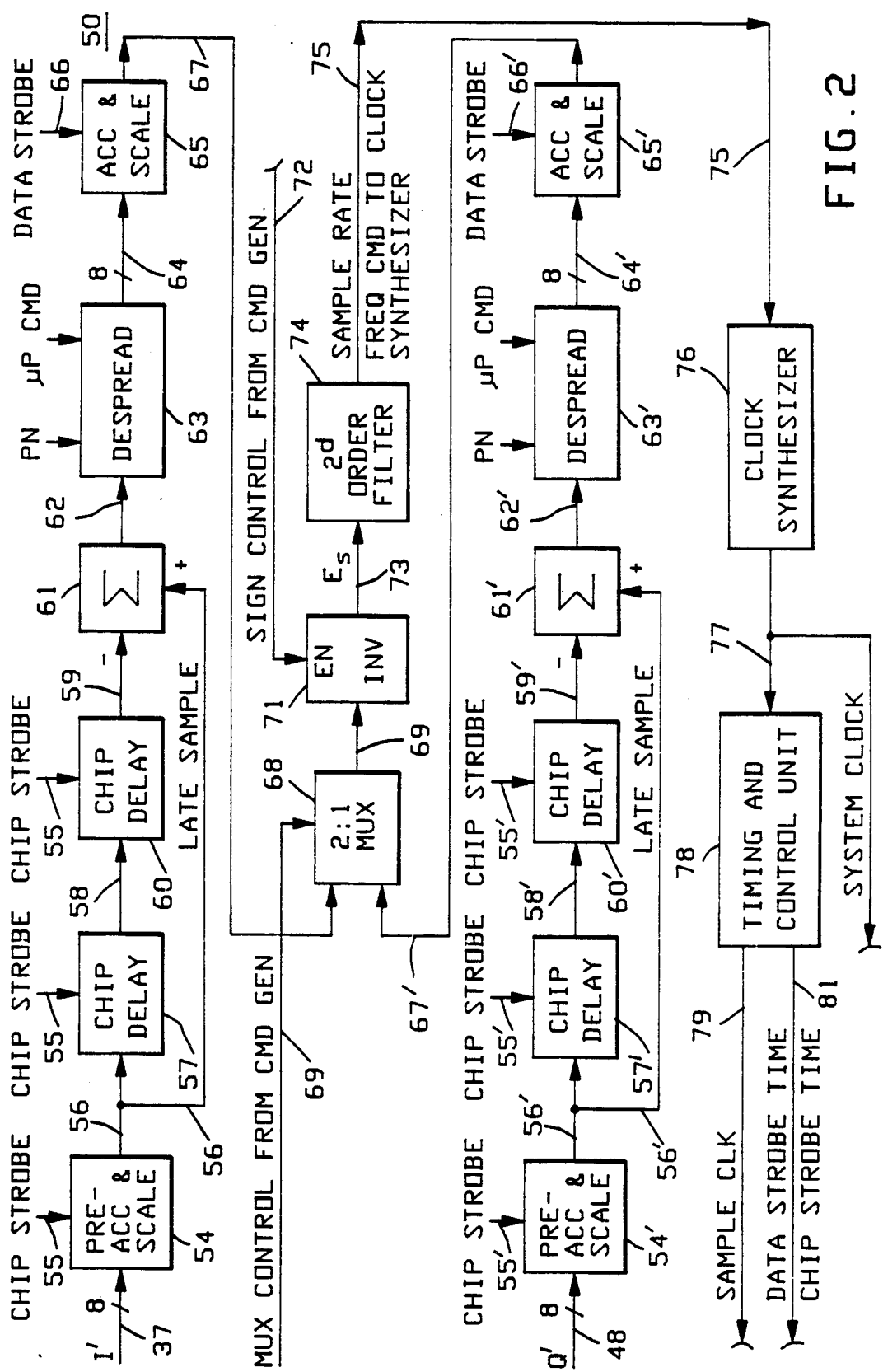
FIG. 2 is a schematic block diagram of a preferred embodiment programmable digital time error signal generator.

Refer now to FIG. 2 showing a schematic block diagram of a preferred embodiment programmable digital time error signal generator 50. The real or I' channel input on line 37 represents the phase corrected data for the I channel and the data on line 48 represents the phase corrected imaginary or quadrature channel Q. Data on line 37 is applied to a pre-accumulate and scale circuit 54 which accumulates the incoming 8 bits until a chip strobe on line 55 is received. The chip strobe signal causes the accumulated and scaled data to be dumped onto output line 56 in a manner which will be discussed in greater detail hereinafter. The accumulated and scaled data on line 56 is applied to a chip delay circuit 57 which is strobed by the same chip strobe signal 55 to produce delayed accumulated and scaled data information on line 58 which is again delayed by chip delay 60 and strobed to output line 59 which is connected to the negative input of summing circuit 61 which receives the late sample of the data on line 56 at the positive input of the summing circuit 61. Thus, the data on line 59 is the early version of the on time delayed data and the summing circuit 61 subtracts an early chip sample from a late chip sample. The output of summing circuit 61 on line 62 is applied to a despreading circuit 63 which is activated if the information received on line 37 has been previously spread. The despreading circuit 63 is deactivated by employing a constant PN level. The despread circuit 63 is active when the microprocessor command defines the type of despread applied and a proper despreading code is also applied. The recovered despread information on output line 64 is applied to a bit rate accumulate and scale circuit 65 which receives its bit rate data strobe on line 66. The manner in which the accumulate and scale circuit 65 produces an accumulated an scale error signal on line 67 will be described in greater detail hereinafter. For purposes of the present invention, it will be understood that the portion of the circuit from the input line 37 to the output of the despread circuit 63 may be considered as an early sample-late sample circuit means which generates an error signal indicative of the time magnitude difference between the transition time of the analog data downstream and the chip strobe time which will be generated by the timing and control circuits to be explained hereinafter. It will be understood that the digital data which appears at the input of pre-accumulate and scale circuit 54 also contains information which will identify the transition time of the analog data signal.

The accumulated error signal on line 67 is shown coupled to a multiplexor 68 which is controlled by a MUX control signal from the command generator (not shown) on line 69. The output of the multiplexor 68 on line 69 is applied to an inverter circuit 71 which has an enable or sign control input coupled to a sign control signal on line 72 from the command generator (not shown). It is necessary to determine the sign of the data in the I channel and apply this sign as a positive or negative enable or not enable signal to the inverter 71. The information on line 67 is indicative of the difference between the transition time and the chip strobe time multiplied by the sign of the data and this will cause the error information to be 180° out of phase for negative data. The sign control signal on line 72 resolves this phase ambiguity. Thus, the error signal output from inverter 71 on line 73 is an error signal magnitude $E_s$ which also contains a proper sign. The error signal on line 73 is applied to a filter 74. In the preferred embodiment of the present invention, the filter selected for best mode of operation is a second order filter which produces a frequency command containing sufficient information on line 75 to direct the clock synthesizer 76 to a desired frequency (or some system clock time) which will reduce the $E_s$ error signal on line 73 to zero. The system clock on line 77 is applied to the digital to analog converter 51 shown in FIG. 1 as well as filters 32 and 44 and other components in the system. For purposes of the present invention, the timing and control unit 78 receives a system clock and produces on output line 79 and 81 the sampling clock, the data strobe time and the chip strobe time used in the FIG. 2 embodiment of the digital time error signal generator.

Since the components in the I channel and the components in the Q channel are identical and are operated by similar strobe signals, to simplify the explanation of the present invention, the components and lines in the Q channel have been numbered with identical numbers using prime suffixes to the component numbers in the I channel and their description is the same. However, it will be understood that there are exceptions and instances in which the Q data strobe signals may be different from the I data strobe signals. Such requirements for different strobe signals are well known in this art and do not require further explanation. Before referring to FIG. 3 it will be noted that a pre-accumulate and scale circuit 54 is provided in the novel early sample-late sample circuit means which is strobed at the chip rate. A second novel accumulate and scale circuit 65 is shown being strobed at the bit data strobe rate. As will be explained hereinafter both of these accumulator and scale circuits may be made in the same manner using the same components.

Figure 3:
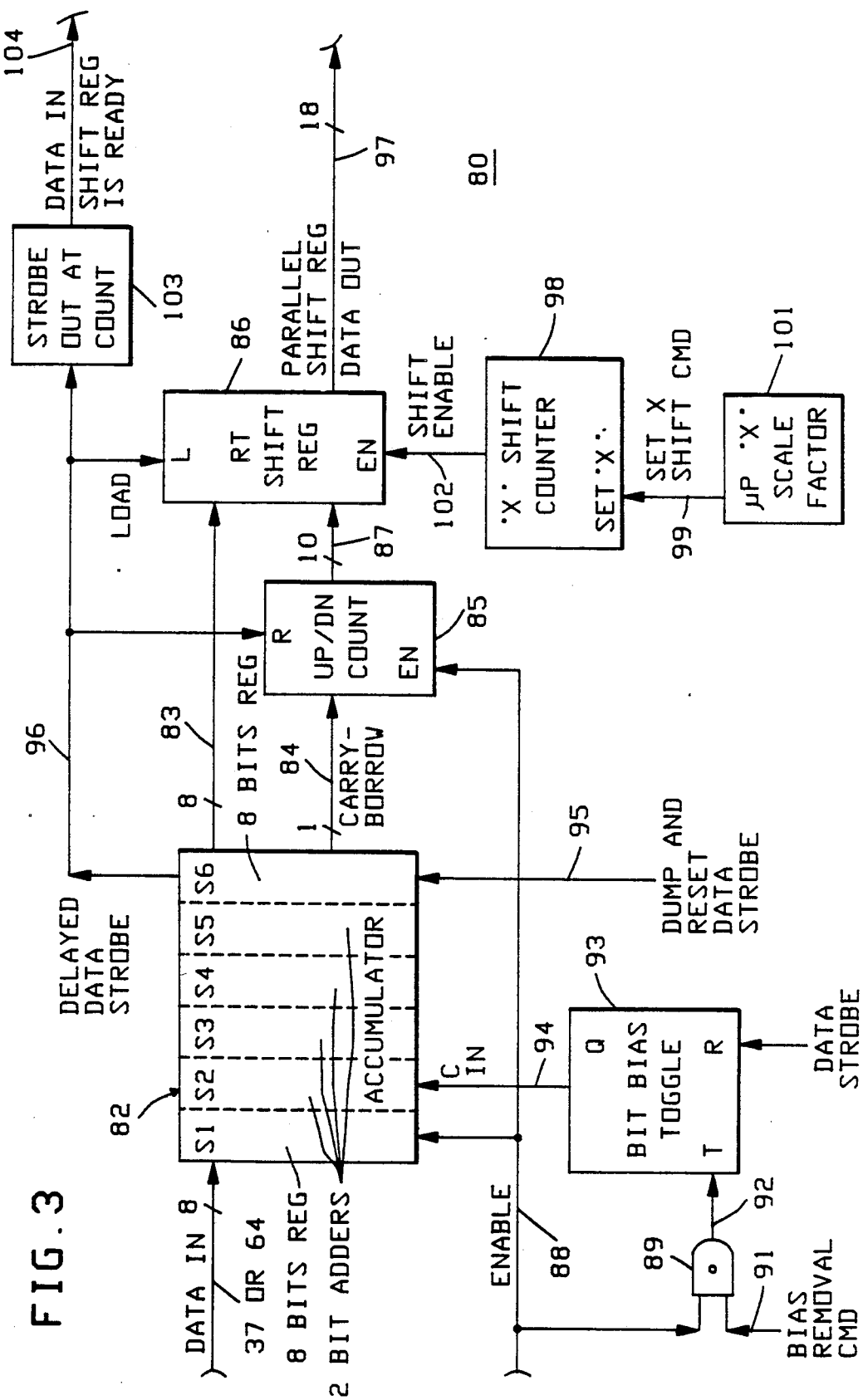
FIG. 3 is schematic block diagram of a preferred embodiment programmable digital accumulator and scale circuit.

Refer now to FIG. 3 showing a schematic block diagram of a preferred embodiment programmable digital accumulate and scale circuit 80. In the preferred embodiment of the present invention, eight bit parallel data is occurring on input lines 37 or 64 or their channel equivalents which is applied to the input stage of accumulator 82. In the preferred embodiment of the present invention, the accumulator 82 may be configured as a pipeline accumulator which has an input register S1 and an 8-bit output register S6. The intermediate stages S2 through S5 are representative of four stages each having 2-bit adders configured in a pipeline configuration so as to produce a basic output of 8 bits on line 83 and the four intermediate stages will produce carry or borrow bits on line 84 which are applied to a 10 stage up or down counter 85 to produce an additional 10 bits for the 18 bit shift register 86 which comprises the output stage or output register of the accumulate and scale circuit. It will be understood that the accumulator 82 can be an 18 stage accumulator which would eliminate the need for the up/down counter which highly simplifies the present embodiment 18 bit output accumulator.

An enable signal on line 88 is shown being applied to the input stage S1 and the enable input of the up/down counter 85. This enable signal is generated at the timing and control unit 78 and is a necessary input for the up/down counter and the accumulate and scale circuit 65. The pre-accumulate and scale circuit 54 may be tied to high enable signal and does not require the same enable signal. Enable input line 88 is applied to AND gate 89 along with a bias removal command signal on line 91 which may be hard wired preset or programmable by the microprocessor. The output line 92 from AND gate 89 serves to toggle the bit bias toggle circuit 93 so as to produce a carry in signal on line 94 every other enable time.

The reason for applying a 1 bit carry in every other enable time is to provide a one-half bit carry in every enable time which compensates for the truncation of the least significant bit figures which occur upstream in the FIG. 1 components.

The dump and reset data strobe signal on line 95 is applied to the output stage of the accumulator 82. The up/down counter 85 is reset by a delayed strobe on output line 96 which causes the right shift register 86 to be loaded with the information on lines 83 and 87 while resetting the output stage and the up and down counter. The output of the right shift register 86 on line 97 may be scaled by the novel scaling circuit comprising an X shift counter 98 adapted to receive via line 99 a scaling factor which is generated by the microprocessor (not shown) as a programmable X input. The command at box 101 will set the X shift counter 98 to the scale factor X which is counted down while generating a shift enable signal on line 102 which enables the right shift register to output or shift out the number of stages indicated by the X scale factor.

Another feature of the present invention is the strobe out generator 103 which receives the delayed strobe signal on line 96 when the right shift register 86 is first loaded. Since the X shift counter 98 is the means by which the information in right shift register 86 is outputted on line 97 the shifted output on line 97 should be complete by the end of the X shift counter operation which is limited to less than 16 stages. Thus, by setting the output strobe count to the maximum count of the X shift register, all of the output data on line 97 should be complete. If no subsequent delayed data strobe on line 96 has occurred at the input of strobe out counter 103, a signal on line 104 is generated indicating that the information in the right shift register 86 is set and can be utilized.

Having explained a preferred embodiment programmable digital time error signal generator and a preferred embodiment programmable digital accumulate and scale circuit in a preferred embodiment time tracking loop environment it will be appreciated that the circuit components employed may be easily implemented on a very large scale integrated circuit chip with other system components of a communications receiver. It is possible to use a commercially available clock synthesizer 76 off chip and bring the output signal on line 77 back to an on chip timing and control unit 78 to further simplify a preferred embodiment tracking loop.

It will be understood that the preferred embodiment accumulate and scale circuit described in FIG. 3 is a preferred embodiment to be employed in the FIG. 2 time error signal generator and other embodiments and other forms of accumulate and scale circuits would not render the time error signal generator inoperable.

What is claimed is:

1. A programmable digital accumulate and scale circuit comprising:
   an input accumulator only as wide as the input data stream coupled thereto,
   said accumulator comprising an input buffer stage coupled to a plurality of adder stages and an output register coupled to said adder stages for storing the accumulated input data lower order bit values,
   said adder stages having a carry and borrow output coupled to an up and down counter means, and
   said up and down counter means providing an output width of most significant bits in excess of the input data stream bits, whereby the effective width of said accumulator is extended by the number of carry bits.

2. A programmable digital accumulate and scale circuit as set forth in claim 1 which further includes,
   a right shift register coupled to the outputs from said input accumulator and from said up and down counter for storing the output bit values therefrom including the most significant bit values in excess of the input data stream bits.

3. A programmable digital accumulate and scale circuit as set forth in claim 2 which further comprises scaling means coupled to said right shift register for programmably generating an output from said right shift register of a predetermined number of the most significant bits in said right shift register.

4. A programmable digital accumulate and scale circuit as set forth in claim 3 wherein said scaling means comprises a presettable shift counter coupled to said right shift register for selecting the desired number of output stages of said shift register.

5. A programmable digital accumulate and scale circuit as set forth in claim 4 wherein said programmable shift counter comprises a programmable preset counter coupled to program means for setting a scale factor therein.

6. A programmable digital accumulate and scale circuit as set forth in claim 2 which further includes a strobe output counter adapted to receive a delayed data strobe signal from the output of said accumulator register for storing the accumulated values and for generating a ready signal indicative of said right shift register being stable and ready for data output.

7. A programmable digital accumulate and scale circuit as set forth in claim 6 wherein said strobe output counter is preset to a count value which equals or exceeds the maximum number to be used as scale factor.

* * * * *